US007745771B2

(12) United States Patent
Troxell et al.

(10) Patent No.: US 7,745,771 B2
(45) Date of Patent: Jun. 29, 2010

(54) SYNCHRONOUS IMAGING USING SEGMENTED ILLUMINATION

(75) Inventors: John R. Troxell, Sterling Heights, MI (US); Ronald M. Taylor, Greentown, IN (US); Siddharth S. Rege, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/732,296

(22) Filed: Apr. 3, 2007

(65) Prior Publication Data

US 2008/0245952 A1 Oct. 9, 2008

(51) Int. Cl.
*H01L 27/00* (2006.01)
*G06M 7/00* (2006.01)
(52) U.S. Cl. .................................. 250/208.1; 250/221
(58) Field of Classification Search .............. 250/208.1, 250/221, 214 R; 382/173; 356/5.05, 5.06, 356/5.07, 5.08, 5.03, 3.01–3.15, 4.01–4.1; 359/227, 229, 601
See application file for complete search history.

(56) References Cited

U.S. PATENT DOCUMENTS

| | | | | |
|---|---|---|---|---|
| 6,236,035 | B1 * | 5/2001 | Saar et al. ................... | 250/221 |
| 6,373,557 | B1 * | 4/2002 | Mengel et al. ............. | 356/4.07 |
| 6,572,139 | B2 * | 6/2003 | Adachi ........................ | 280/735 |
| 6,734,951 | B2 * | 5/2004 | Uomori et al. ............... | 356/3.1 |
| 6,968,073 | B1 * | 11/2005 | O'Boyle et al. ............. | 382/104 |
| 2003/0193589 | A1 * | 10/2003 | Lareau et al. ............... | 348/294 |
| 2004/0061850 | A1 | 4/2004 | Fisch et al. | |
| 2005/0046694 | A1 | 3/2005 | Quine | |
| 2005/0195483 | A1 * | 9/2005 | Grot et al. ................... | 359/566 |
| 2006/0192873 | A1 * | 8/2006 | Yaffe .......................... | 348/297 |
| 2007/0023660 | A1 | 2/2007 | Seger et al. | |

FOREIGN PATENT DOCUMENTS

| WO | 0205549 | 1/2002 |
|---|---|---|
| WO | 2006085834 | 8/2006 |

OTHER PUBLICATIONS

European Search Report dated Apr. 22, 2009.

* cited by examiner

*Primary Examiner*—Georgia Y Epps
*Assistant Examiner*—Jennifer Bennett
(74) *Attorney, Agent, or Firm*—Jimmy L. Funke (57) ABSTRACT

In an actively illuminated imaging system, illumination of a segmented scene is synchronized with an image sensing period. A scene is segmented into a plurality of scene portions utilizing a segmented lens. In an aspect, a first scene portion is illuminated when an imager is actively collecting photogenerated charge from the first scene portion, and a second scene portion is illuminated when an imager is actively collecting photogenerated charge from the second scene portion. The sensitivity of an image sensor is maximized, while simultaneously minimizing the amount of light that must be supplied to illuminate a scene. An irradiance pattern is varied allowing a more uniform distribution of light. Bands of varying wavelength, polarization, and light intensity may be variously applied to illuminate individual scene segments, as needed to enhance an identification of an object in the scene. The present invention is particularly useful with high frame rate imaging systems.

19 Claims, 10 Drawing Sheets

SYNCHRONOUS IMAGING USING SEGMENTED ILLUMINATION

FIELD OF THE INVENTION

The invention relates generally to a photodetector, and more particularly to synchronizing the illumination of a segmented scene with an image sensing period, in an actively illuminated imaging system.

BACKGROUND OF THE INVENTION

Numerous imaging applications require integrated or active illumination to augment ambient lighting and/or to ensure constant scene illumination irrespective of other illumination sources. This is especially true with imagers having higher frame rates. In many cases, it is necessary or desirable for such illumination sources to be non-visible to the human eye, but detectible by an image sensing device.

A generally employed technique for providing non-visible illumination, as defined by the ability to be detected by the human visual system, is to use wavelengths that are longer than the human eye can detect. Generally, these are referred to as infrared wavelengths. Infrared light comprises light with wavelengths in excess of approximately 700 nm. Particularly useful wavelengths are those from approximately 700 nm through approximately 1100 nm, generally referred to as near-infrared wavelengths. These are wavelengths that can be detected by silicon-based photodetectors such as the photodiodes or photocapacitors that are used in essentially all CMOS and CCD imagers. The pervasive nature of silicon based integrated circuits, and consequently that of silicon based photodetectors and silicon base imager chips, makes the resulting cost of these devices lower than the cost of devices fabricated using other materials and technologies, that might offer other ranges of spectral sensitivity. As a result, it is generally desirable to work within the range of 700 nm through 1100 nm for imaging and detection systems. An alternative to the use of infrared wavelengths is the use of wavelengths shorter than the human eye can detect; that is, wavelengths shorter than approximately 420 nm. These are referred to as ultraviolet wavelengths. Generally, however, sensors capable of detecting such wavelengths are less readily available, and generally more expensive than those that detect light in various portions of the infrared wavelength regime. Additionally, wavelengths shorter than approximately 420 nm become increasingly hazardous to both the human eye and other portions of the human body as the wavelength is reduced further into the ultraviolet regime. Consequently, such short wavelength light is generally not as convenient to use for imager and detector systems. In addition, silicon based devices are generally not sensitive to wavelengths significantly lower than approximately 350 nm, which presents another impediment to the use of such short wavelengths for imaging and detection applications, as compared to systems operating at near-infrared wavelengths.

Eye safety issues limit the maximum irradiance of illumination sources for actively illuminated non-visible imaging applications. Limitations apply for both visible and non-visible illumination sources. These eye-safety limitations represent a major challenge for sensing applications in which ambient lighting varies by a large amount, since an actively illuminated sensing system must be capable of essentially overpowering ambient lighting, such as sun light.

Since the irradiance of actively illuminated systems is limited, this implies that the sensitivity of the detector and or imagers must be appropriately high. Generally, photodetectors, whether they are individual elements or combined in arrays to form imagers, provide at least two physical means to control sensitivity. The fundamental sensitivity of a given detector element is determined by the materials properties of the components of the detector. Beyond that fundamental sensitivity, generally referred to in terms of the detector's quantum efficiency, a given detector can effectively have increased sensitivity if it collects light over a longer period of time, for example if it integrates the collected photo-induced charge. Thus, detection or charge-collection time is one aspect of controlling detector sensitivity. Another aspect relates to the physical geometry of the sensor; that is, the effective aperture of the imaging system or detector—how many photons per square centimeter physically impinge upon the sensing surface. However, if either the detector or objects in the scene are moving, additional constraints are placed upon the amount of time available for charge collection, which may limit the detector sensitivity. On the other hand, as detector areas increase, so does cost. Consequently, increasing sensitivity by arbitrary increases in detector area generally is not acceptable. As a result of these constraints, it is important to optimally match detector sensing opportunities or intervals with the available incident light. Typically, this involves pulsing of the illumination light source or sources.

Typically, arrays of imagers are designed such that the image is sensed or "collected" by the array of individual photodetectors, and then read out, one detector element or pixel at a time. The collection process generally involves some mechanism for enabling each of the photodetector elements to collect light for the same length of time; generally this time is referred to as the integration time. Ideally, every detector element in a given imager array will be collecting light for the same length of time, as described above, and synchronized in time. That is, each photodetection element of the array will start collecting light simultaneously at a first time, and stop collecting light simultaneously at a second time. If the detectors do not all start and stop collecting light at the same time, then objects in the image could be distorted due to relative motion of the imaging array and the scene being imaged. Alternatively, if the light collection time period is not identical for all elements of the imaging array, some areas might appear brighter than other areas simply due to the fact that the corresponding pixels or photodetector elements were allowed to collect light for a longer time, thereby effectively shifting the gray scale of the corresponding portions of the image.

Synchronization of all photodetector elements to both start and stop collecting light at the same times prevents the distortion of collected images due to the motion of objects within the scene. Synchronization of the light collection periods of all photodetector elements also enables efficient use of pulsed illumination sources, such as "flash lamps." Since all photosensitive elements collect light at the same time, if the flash lamp is discharged during that time period, the potential illuminace of all portions of the scene, as determined by the light collected by individual photodetector elements, will be equal, resulting in the most accurate capture of the scene to be imaged. Pulsed illumination generally enables the most efficient use of a limited optical power budget, since the light (the total amount of which is limited by eye safety requirements) is only being emitted during those time periods in which the sensor is capable of detecting the resultant light reflected from the scene being imaged.

Since the photo-induced charge collected at each photodetector element of an array must generally be read out from an array sequentially one row at a time, and since it is desirable to avoid distortion of the resultant image as described above, there are typically significant portions of time during which any given photodetector element is not collecting light. Illuminating the scene during these periods essentially wastes that portion of the illumination, since it cannot be detected.

In order to maximize the sensitivity of an imager in a given application, it is necessary to maximize the integration time. However, in order to capture the motion of objects within a scene (such as typically occurs for imagers used in automotive imaging applications) generally it is necessary to maximize the frame rate as well. The need to simultaneously maximize both sensitivity and imager frame rate produces a situation in which every pixel in each row of the imager array is either collecting light, or is in the process of transferring the photo-detected signal to the imager chip output. This however eliminates the ability to have all pixels collecting light simultaneously. Thus, a need exists to identify a system and method to simultaneously optimize imager sensitivity and image capture frame rate while minimizing image distortion due to temporal shifts in the photosensitivity periods of different portions of the imaging array.

Some contemporary imager arrays are designed such that the individual pixels are capable of simultaneous photocharge collection and photocharge readout of the previous frame. This requires a complicated pixel structure, entailing more transistors per pixel. Consequently, the pixels are larger for a given photocollection area, and the imager array will cost more with lower sensitivity. The contemporary imagers of this type are referred to as global shutter imagers.

SUMMARY OF THE INVENTION

A method and system for an actively illuminated imaging system is provided. The present invention improves the performance of an actively illuminating imaging system by synchronizing the illumination of a specific scene portion with a photosensitive period of a portion of an imaging array that is at the moment in time capable of sensing the specific scene portion. In an embodiment, the present invention spatially varies an irradiance pattern allowing a more uniform distribution of light by redistributing intensity away from the center of a field to the periphery of the field. The sensitivity of an image sensor is maximized, while simultaneously minimizing the amount of light that must be supplied to illuminate a scene. Therefore, a wider margin of safety is provided between image sensing system operating conditions and eye safety limiting conditions. Further, because the distribution of emitted light is widened, being emitted from multiple locations within the illumination system, the intensity of light at any physical location in the path of the light is reduced, thus further improving the eye safety margin. Electrical power reductions and heat reductions is achieved by limiting the generation of light that cannot currently be detected by the imaging portion of the system. Alternatively, higher total illumination of a scene, at the same power levels of contemporary systems, is achieved. Improvement in signal to noise ratio is also provided given the same illumination power as contemporary systems.

The present invention is particularly useful with high frame rate imaging systems, such as frame rates about 30 frames per second. Both global shutter imagers and rolling shutter imager implementations can utilize the present invention. Modification of the imager chip or of imager chip performance is not required by the present invention. Numerous useful applications include automotive imaging applications such as monitoring driver gaze, vehicle night vision systems, vehicle backup aid systems and other applications that require dedicated illumination sources to illuminate objects being imaged, such as security systems, and machine vision systems.

Features of the invention are achieved in part by synchronizing the illumination of a segmented scene with an image sensing period. A scene is segmented into a plurality of scene portions that can be divided either vertically, horizontally, or in some other pattern. The scene can also be segmented by imager pixel row. In an example, the scene is segmented in a first scene portion and a second scene portion. The first scene portion and the second scene portion are sequentially illuminated. The first scene portion is illuminated when an imager is actively collecting photogenerated charge from the first scene portion, and the second scene portion is illuminated when an imager is actively collecting photogenerated charge from the second scene portion.

Segmentation of the regions of a scene being illuminated is performed in a manner consistent with the readout process of an imager chip. For example, if horizontal rows of pixels are sequentially read out from an imager chip, then segmentation is performed by groups of horizontal rows. If the imager chip is rotated so that vertical "rows" are sequentially read out by the imager chip, then segmentation is performed by groups of vertical rows. In the case of imager chips in which multiple readouts are simultaneously occurring, the segmentation is consistent with the pattern of pixel readout employed in those imager chips.

In an embodiment, the scene portions are sequentially illuminated utilizing a segmented lens. A first light source transmits light to a first segment of the segmented lens to illuminate the first scene portion, and a second light source transmits light to a second segment of the segmented lens to illuminate the second scene portion. The light source (i.e., a LED) can be sequenced so a uniform scene illumination distribution is created. By spatially varying a typical irradiance pattern and redistributing intensity away from a scene center and to a periphery of the field as well, a more uniform distribution of light is achieved. In an embodiment, the first light source transmits a first light, and the second light source transmits a second light, wherein the first light and the second light vary in at least one of band of wavelength and polarization, to enhance an identification of an object in the scene. The first light source can also be configured to transmit a light intensity that is different than a second light intensity transmitted by the second light source, to also enhance an identification of an object in the scene.

Other features and advantages of this invention will be apparent to a person of skill in the art who studies the invention disclosure. Therefore, the scope of the invention will be better understood by reference to an example of an embodiment, given with respect to the following figures.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE INVENTION

Exemplary embodiments are described with reference to specific configurations. Those of ordinary skill in the art will appreciate that various changes and modifications can be made while remaining within the scope of the appended claims. Additionally, well-known elements, devices, components, methods, process steps and the like may not be set forth in detail in order to avoid obscuring the invention. Further, unless indicated to the contrary, the numerical values set forth in the following specification and claims are approximations that may vary depending upon the desired characteristics sought to be obtained by the present invention.

A method and system are described herein for an actively illuminated imaging system. The present invention improves the illumination of a scene by synchronizing an illumination of a segment or portion of a scene when an imager is actively collecting photogenerated charge from that portion of the scene. The present invention can spatially vary an irradiance pattern allowing a more uniform distribution of light. This results in numerous advantages including minimizing the necessary supplied light, and reduction of electrical power and heat, as described below. Further, modification of an imager chip is not required by some embodiments of the present invention. The present invention is particularly useful with high frame rate imaging systems, such as automotive imaging applications, security applications, or simply augmenting illumination for a conventional imager.

Turning now to a contemporary imager, a contemporary image sensing chip is organized in a manner that allows a given row of the array to collect photogenerated charge at essentially all times except during the time in which the data is being read out from the given row. For most imager chip technologies, each row is read out sequentially, until the entire collected image has been readout. At that point, the readout process begins again with the first row of the array. Thus, the maximum amount of time during which a given pixel in a given row of the imager array can collect charge is essentially the inverse of the frame rate of the imager chip/camera, minus the amount of time required to read out a single row of the array. The effective sensitivity of an imager chip is directly related to the amount of time during which photoinduced charge can be collected (the charge integration time), and thus it is usually desirable to maximize the possible integration time.

Figure 1:
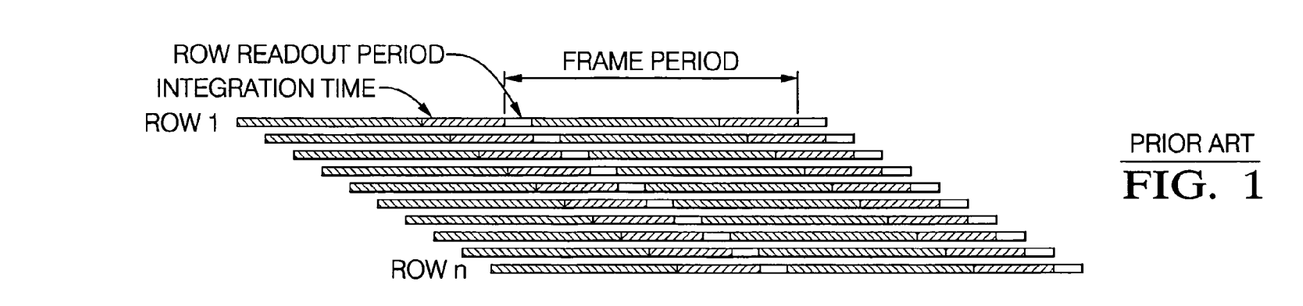
FIG. 1 is a schematic representation of a conventional imaging array-readout utilizing rolling integration, illustrating a highly illuminated scene and less than maximum imager integration time.

Referring to the drawings wherein identical reference numerals denote the same elements throughout the various views, FIG. 1 illustrates a schematic representation of a conventional imaging array readout technique typically referred to as rolling integration. A large majority of imagers that are currently available make use of the rolling integration light collection and readout process. In these imagers, the maximum frame rate (maximum image capture and readout repetition rate) is determined by the time required to sequentially readout the contents of each photodetector, one row at a time. As illustrated, this readout having a highly illuminated scene requires less than maximum imager integration time. The design of the pixels for a rolling integration imagers does not allow the possibility of simultaneously collecting photogenerated charge and reading out the photogenerated charge. A consequence of this pixel design, and the sequential readout of each pixel, one row at a time, is that generally each row of pixels is collecting light at a different time period, even though the length of the time period for each row is identical. Consequently, the motion related distortion issue described above can occur. In addition, however, the staggered nature of the collection periods of each row of pixels makes it, at best, very difficult to adequately employ flash illumination while maintaining maximum integration times and maximum imager frame rates. As a result, either (a) the illumination has to be provided with essentially a 100% duty cycle (i.e. always on) or (b) both sensitivity (integration time) and/or frame rate must be reduced in order to identify a period in time during which all of the rows of pixels are simultaneously collecting light.

Some special cases do occur; for example, the use of an optical flash with a conventional still camera that employs rolling integration. In this case, the operating assumptions are: (a) that only a single image is being collected, (b) that the flash provides light during a chosen time period during which all of the rows of the imager are simultaneously collecting light, the flash provides a sufficiently high level of illumination to compensate for the limited integration time of the individual pixels of the imager array, and (c) illumination resulting from other light sources, which may not illuminate the scene equally for every photodetector element, is relatively low in intensity with respect to the intensity provide by the flash lamp. However, these assumptions are not consistent with relatively high frame rates (typically 30 frames per second) required for most automotive imaging applications.

Figure 2:
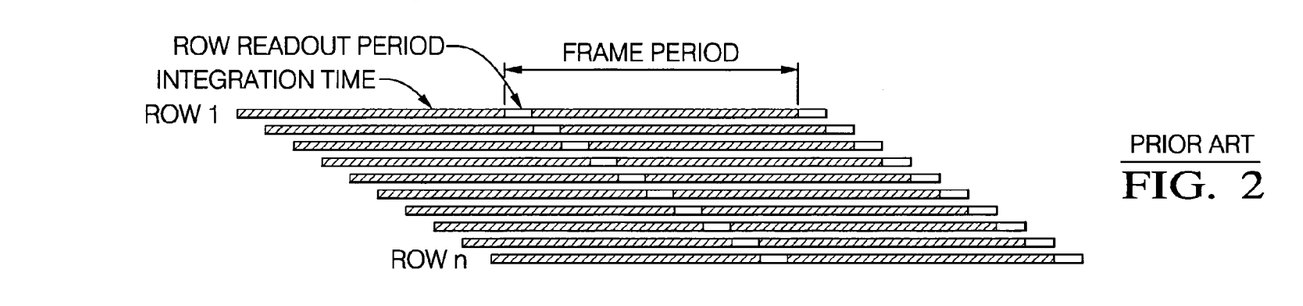
FIG. 2 is a schematic representation of the conventional imaging array readout utilizing rolling integration as in FIG. 1, illustrating a poorly illuminated scene, requiring maximum imager integration time.

FIG. 2 is a schematic representation of the conventional imaging array readout utilizing rolling integration as in FIG. 1. This example illustrates a poorly illuminated scene, requiring maximum imager integration time. In some imaging applications, even when the integration time is maximized, there may be insufficient ambient illumination to allow image capture. In such cases, it is necessary to augment the ambient illumination with an additional light source or sources. In applications where eye safety considerations are involved, there are limitations on the amount of light that can be provided by such additional light sources. It then becomes important to match the manner in which the additional light is supplied to the specific manner in which the image sensor can detect the scene information with maximum sensitivity. For example, for an imager operating at maximum integration time and maximum frame rate, as shown in FIG. 2, it is necessary to illuminate the scene for the entire frame period. If the scene were illuminated only for some fraction of the frame period, then some rows of the imager array would not receive as much light as other rows, resulting in scene distortions as discussed supra.

Figure 3:
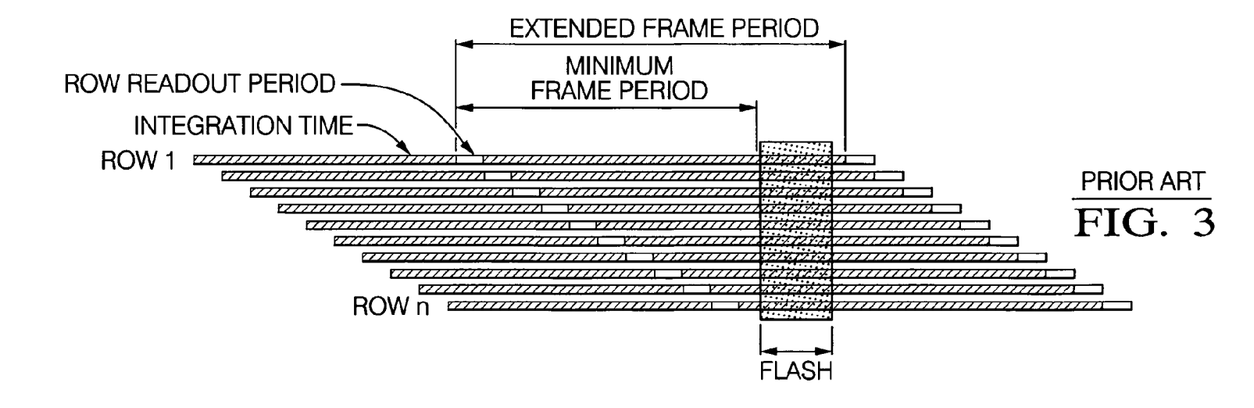
FIG. 3 is a schematic representation of another conventional imager array readout illustrating operation at a reduced frame rate and maximum integration time, enabling simultaneous illumination of all rows of array with a pulsed illumination source.

Referring to FIG. 3, a conventional imager array technique is illustrated that operates at a reduced frame rate and maximum integration time, enabling simultaneous illumination of all rows of array with a pulsed illumination source. If the ambient lighting is much less intense than the system illumination source, it may be possible to operate the imager in the manner shown in FIG. 3, wherein the frame rate is reduced to allow for a period of time during which all rows of the imager array can respond to light identically. Flash lamp illumination may be incorporated into a video imaging system. Unfortunately, this approach is not well suited for cases in which the system illumination source is not the dominate illumination source. In addition, this requires a reduction in frame rate, which may adversely affect imaging of moving objects or imaging when the imager or camera is in motion with respect to the scene being imaged.

Figure 4:
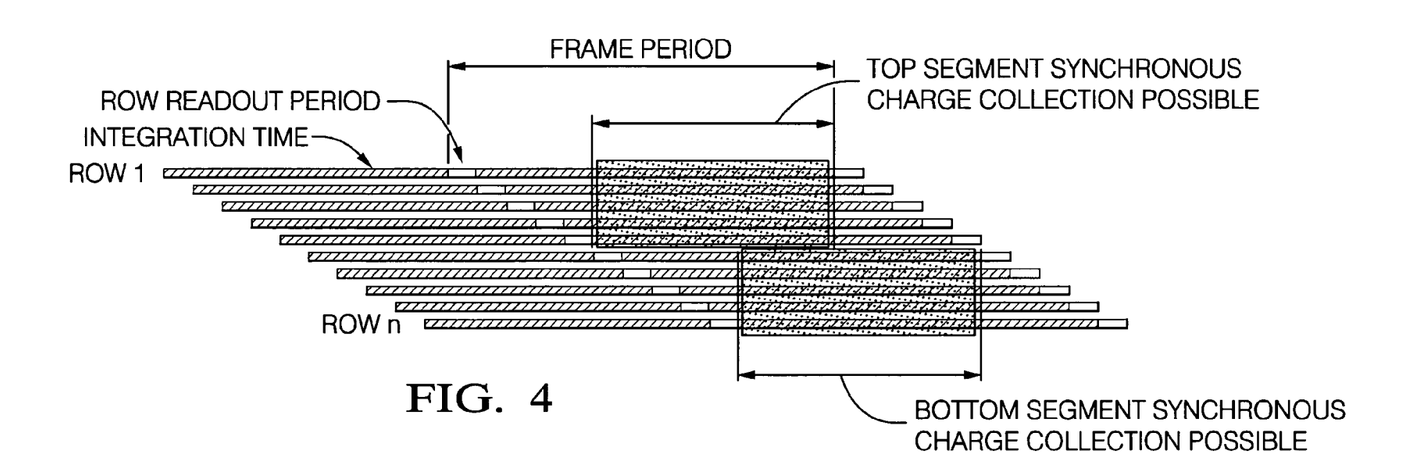
FIG. 4 is an imaging array readout illustrating illumination of a segmented scene synchronized with an image sensing period, wherein the illumination and the image sensing period include a top illumination segment and bottom illumination segment, in accordance with an embodiment of the present invention.

FIG. 4 illustrates an imaging array in an embodiment of the present invention. Illumination of a segmented scene is synchronized with an image sensing period, wherein the illumination and the image sensing period includes a top illumination segment and bottom illumination segment. In an embodiment, the scene is segmented into a plurality of scene portions that can be divided either vertically, horizontally, or in some other pattern. The scene can also be segmented by imager pixel row. In the example shown in FIG. 4, the scene is segmented into a first scene portion and a second scene portion. The first scene portion and the second scene portion are sequentially illuminated. The first scene portion is illuminated when an imager is actively collecting photogenerated charge from the first scene portion, and the second scene portion is illuminated when an imager is actively collecting photogenerated charge from the second scene portion. In this manner, illumination is only provided to those portions of the scene that are being imaged by portions of the imager that are at that time actively collecting photogenerated charge. Thus, the efficiency of illuminating the scene of interest is maximized by appropriately timing the image sensing process and the illumination sources. In an alternative embodiment, the periods of illumination are overlapped when imager rows near the boundaries between when image collection segments are actively collecting light, in order to assure adequate and uniform illumination of those rows.

In an embodiment, the present invention adjusts of the imaging array readout technique. As an example, the integration time is extended to allow for a period of time during which all rows of a top illumination segment can be synchronized with respect to illumination of the segmented scene and the image sensing period. Alternatively, the row readout time is reduced, or the number of pixel rows in the top illumination segment is reduced.

In an embodiment, the present invention spatially varies an irradiance pattern allowing a more uniform distribution of light by redistributing intensity away from the center of a field to the periphery of the field (unlike a contemporary lens system). The sensitivity of an image sensor is maximized, while simultaneously minimizing the amount of light that must be supplied to illuminate a scene. Therefore, a wider margin of safety is provided between image sensing system operating conditions and eye safety limiting conditions. Further, because the distribution of emitted light is widened, being emitted from multiple locations within the illumination system, the intensity of light at any physical location in the path of the light is reduced, thus further improving the eye safety margin. Electrical power reductions and heat reductions is achieved by limiting the generation of light that cannot currently be detected by the imaging portion of the system. Alternatively, higher total illumination of a scene, at the same power levels of contemporary systems, is achieved. Improvement in signal to noise ratio is also provided given the same illumination power as contemporary systems.

Figure 5:
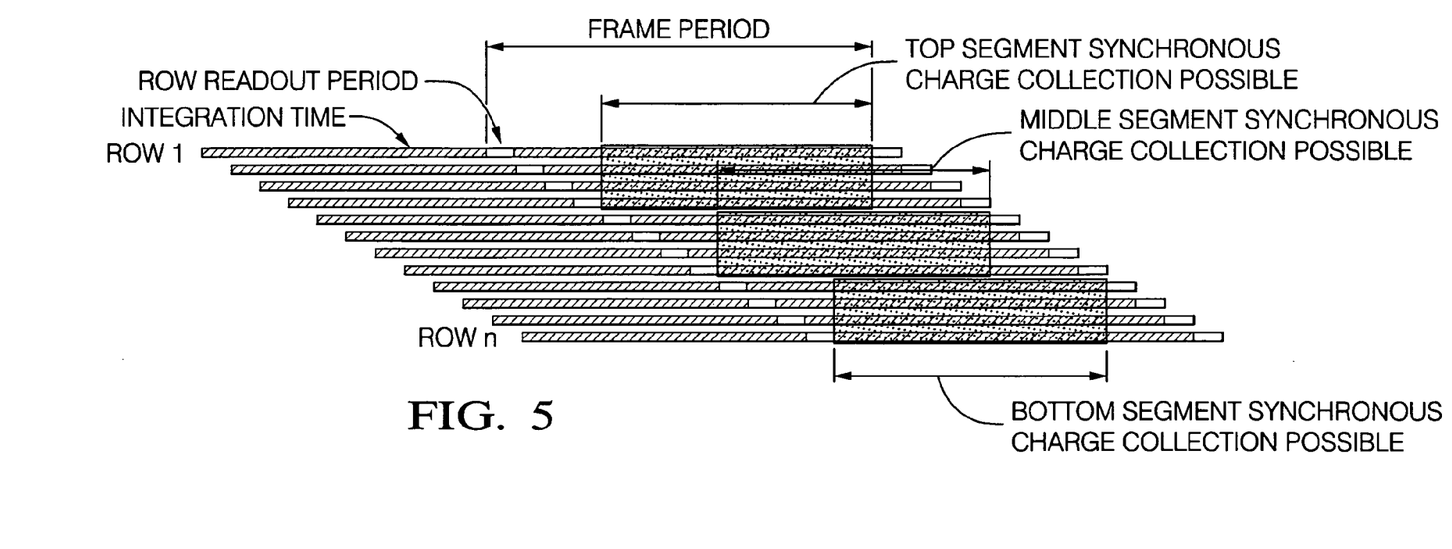
FIG. 5 is a schematic representation of another imaging array readout illustrating illumination of a segmented scene synchronized with an image sensing period, wherein the illumination and the image sensing period include a top illumination segment, a middle illumination segment and bottom illumination segment, in accordance with another embodiment of the present invention.

FIG. 5 illustrates an imaging array in an alternative embodiment of the present invention. As in the embodiment described in FIG. 4, illumination of a segmented scene is synchronized with an image sensing period. However, here the illumination and the image sensing period further includes a middle illumination segment. It is to be appreciated that two or more separate segments or zones of illumination, and/or of imaging could be defined for specific applications. The top scene portion, the middle scene portion, and the bottom scene portion are sequentially illuminated. The top scene portion is illuminated when an imager is actively collecting photogenerated charge from the top scene portion, the middle scene portion is illuminated when an imager is actively collecting photogenerated charge from the middle scene portion, and the bottom scene portion is illuminated when an imager is actively collecting photogenerated charge from the bottom scene portion. In this manner, illumination is only provided to those portions of the scene that are being imaged by portions of the imager that are at that time actively collecting photogenerated charge.

The physical configuration of the imager chip of an imaging system does not have to be changed in order to implement this invention. However, implementation generally will involve alterations to the system illumination components.

Figure 6:
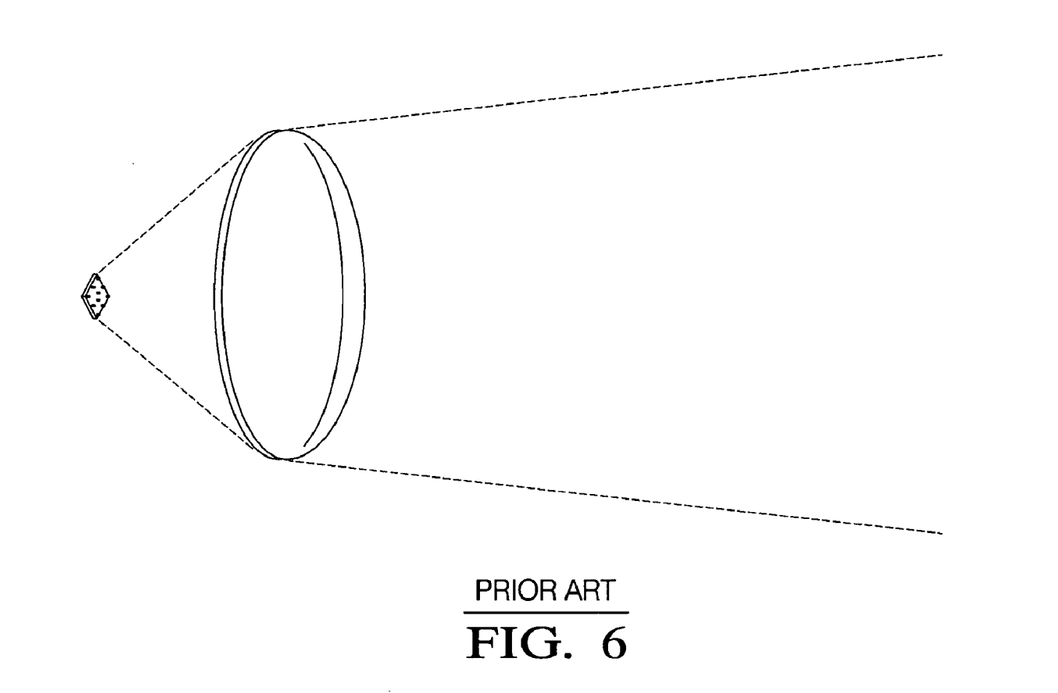
FIG. 6 shows a perspective view of an example of a typical contemporary illumination system based upon a plurality of light emitting diodes (LEDs) and a conventional circular symmetric refractive lens.

FIG. 6 shows an example of a typical contemporary illumination system based upon a plurality of light emitting diodes (LEDs) and a conventional circular symmetric refractive lens. Typically, a plurality of diodes may be necessary in order to achieve sufficient illumination of a scene consistent with the detection ability or sensitivity of the imaging system.

Figure 7:
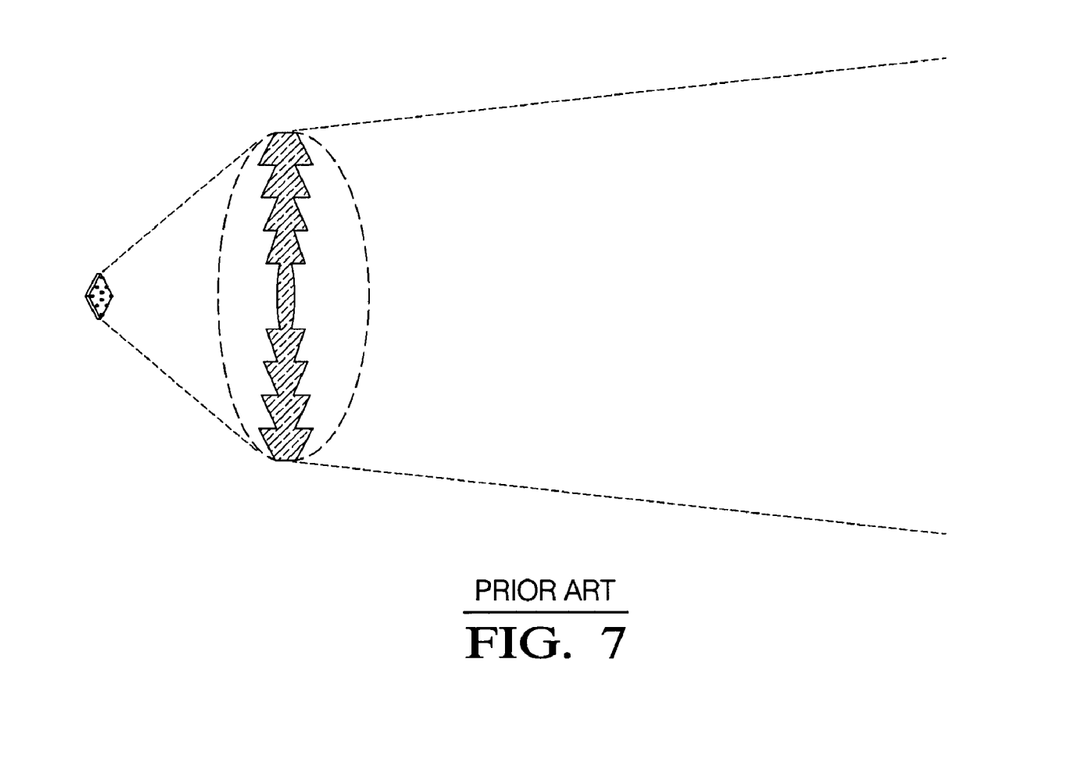
FIG. 7 shows a perspective view of an example of a contemporary illumination system based upon a plurality of light emitting diodes (LEDs) using a circular symmetric Fresnel lens.

An equivalent implementation of an illumination system could be based upon a Fresnel lens, rather than a conventional refractive lens, as shown in FIG. 6. This alternative conventional implementation is shown in FIG. 7. The Fresnel lens essentially segments the overall lens into a set of concentric annular sections known as Fresnel zones. As shown, the single LED array is utilized to illuminate all of the concentric annular sections.

Figure 8:
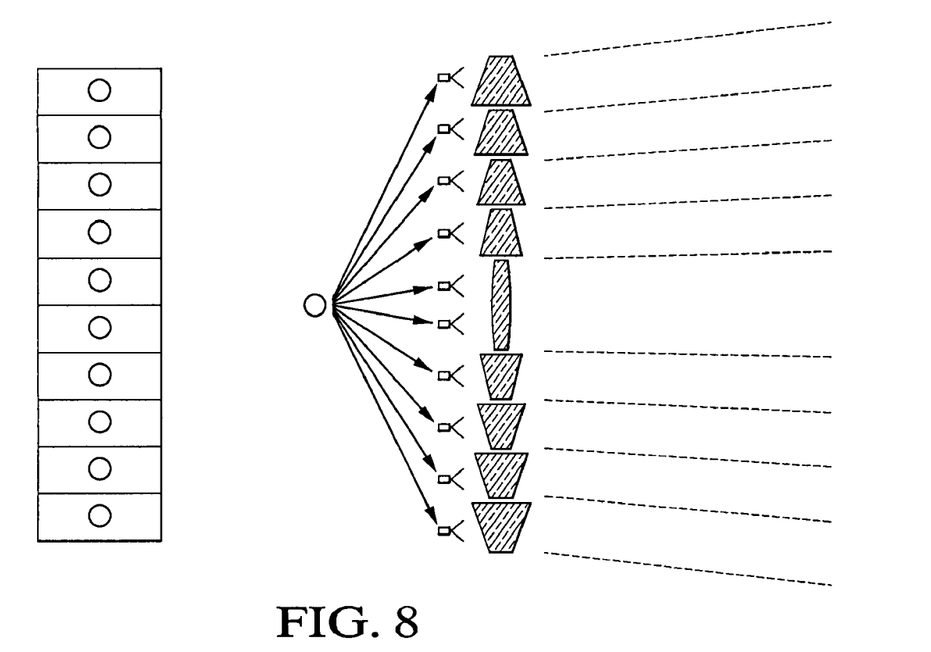
FIG. 8 illustrates a front and a perspective view of a segmented one-dimensional lens structure having a series of distinct illumination zones, wherein distinct light sources are utilized, one light source for each segmented lens zone, in accordance with an embodiment of the present invention.

FIG. 8 illustrates a rectangular segmented one-dimensional lens structure having ten distinct illumination regions or zones. Ten distinct light sources (i.e., LEDs) are utilized, one light source for each segmented lens zone. Thus, in an embodiment, the present invention utilizes the Fresnel-type lens construct to spatially vary an irradiance pattern, allowing a more uniform distribution of light by redistributing intensity away from the center of a field to the periphery of the field. FIG. 8 also shows the patterns of each of the LEDs when operated separately, using the segmented optics. In an embodiment of the present invention, each zone of the image is illuminated by one LED, but since the effective aperture for each LED is proportionately smaller compared to the entire aperture of a conventional lens system, the scene brightness as detected by the imaging array rows that image this portion of the scene is substantially comparable to the conventional system. As described infra, the timing of activation of each LED in each zone is synchronized to correspond with the time during which the portion of the image array imaging that zone of the scene is collecting photogenerated charge.

Figure 9:
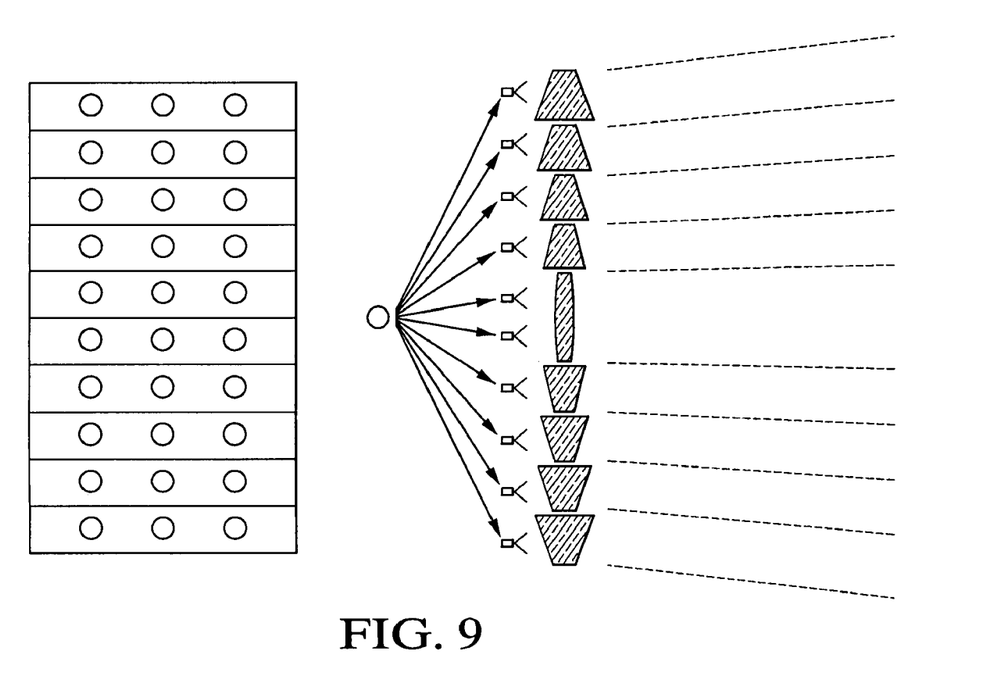
FIG. 9 illustrates a front and a perspective view of a wide segmented two-dimensional lens structure having a series of distinct illumination zones, wherein multiple light sources are utilized, three light sources for each segmented lens zone, in accordance with an embodiment of the present invention.

Additionally, it is to be appreciated that other lens configurations for multiple illumination zones can be utilized with the present invention, including other segmented lenses, a converging lens, a catadioptric lens, and a diverging lens. Similarly, as shown in FIG. 9, in some imaging applications, multiple LEDs may be employed in order to illuminate each segment more uniformly. FIG. 9 illustrates a wide segmented two-dimensional lens structure having a series of distinct illumination zones, wherein multiple light sources are utilized, three light sources for each segmented lens zone.

In an embodiment, the scene portions are sequentially illuminated utilizing the segmented lens. A first light source transmits to a first segment of the segmented lens to illuminate the first scene portion, and a second light source transmits to a second segment of the segmented lens to illuminate the second scene portion. The light source can be sequenced so a uniform (or nonuniform) scene illumination distribution is created. By spatially varying a typical irradiance pattern and redistributing intensity away from a scene center and to a periphery of the field as well, a more uniform distribution of light is achieved. In an embodiment, the first light source transmits a first light, and the second light source transmits a second light, wherein the first light and the second light vary in at least one of band of wavelength and polarization, to enhance an identification of an object in the scene. The first light source can also be configured to transmit a light intensity that is different than a second light intensity transmitted by the second light source, to also enhance an identification of an object in the scene.

Figure 10:
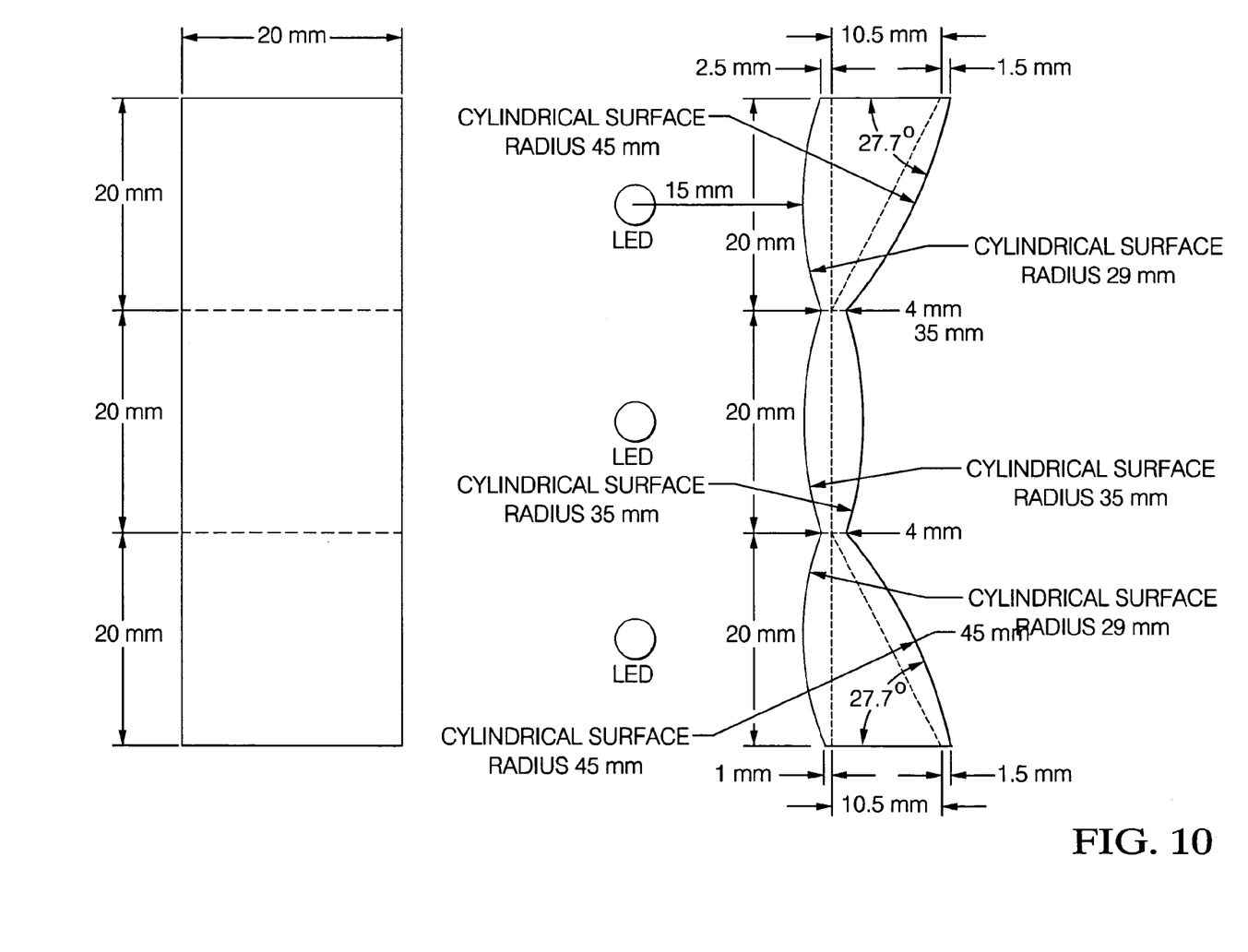
FIG. 10 illustrates a front and a perspective view of a segmented two-dimensional lens structure that creates the illumination distribution profiles as described in FIGS. 11, 12 and 13, in accordance with an embodiment of the present invention.

A further understanding of the above description can be obtained by reference to the following example lens structure and experimental result examples that are provided for illustrative purposes and are not intended to be limiting. FIG. 10 shows a front and a perspective view of a segmented two-dimensional lens structure that creates the illumination distribution profiles as described in FIGS. 11, 12 and 13 supra. As illustrated, three LEDs are employed, one LED for illuminating an individual lens segment. The numerical values as presented represent one embodiment of the present invention, and are not the only distances and sizes that can be employed.

Figure 11:
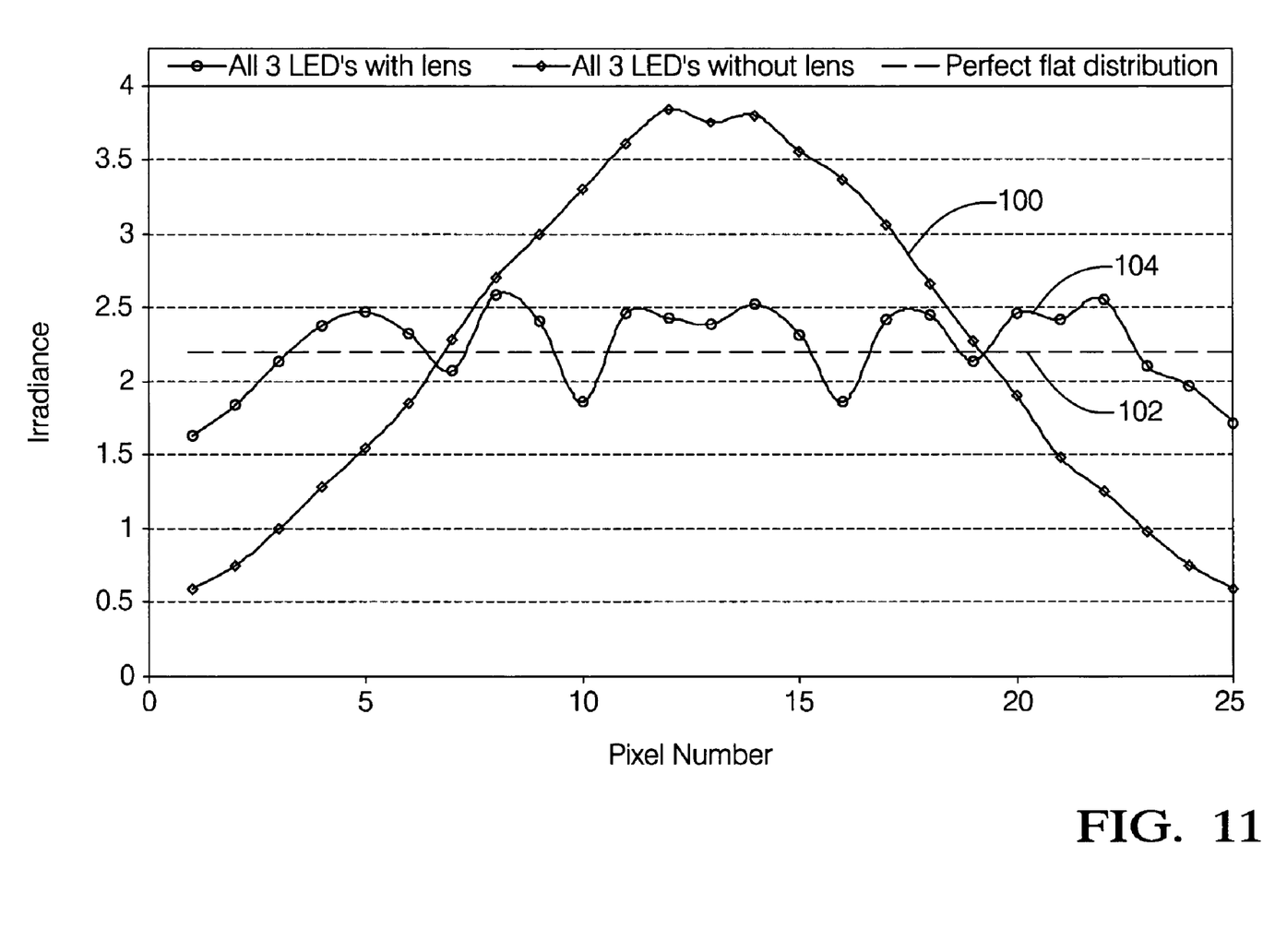
FIG. 11 is a graph of an illumination distribution as a function of position across the rows of a typical image sensor chip, for a traditional lens, a lens according to an embodiment of the present invention, and an ideal flat-field response.

FIG. 11 illustrates an illumination distribution as a function of position across the rows of a typical image sensor chip, for a traditional lens, a lens according to an embodiment of the present invention, and an ideal flat-field response. All LEDs utilized for each distribution provide the same output optical power. The x-axis represents the receiver pixel number for a conceptual imager having 25 grouped rows of pixels, scaled accordingly. The y-axis represents the irradiance in each pixel. Line 100 shows a contemporary illumination pattern obtained by operating all 3 LEDs simultaneously, without the present invention zone defining optics. Line 102 shows an idea flat-field illumination pattern that would provide uniform illumination equally to all pixels of the image sensor array. Line 104 shows the illumination pattern when the zone defining optics are placed before the LEDs according to an embodiment of the present invention. The resulting illumination pattern for line 104 begins to approach that of the idealized flatfield illumination system. The present invention distribution shows a flatter distribution of light as compared to the traditional lens, and thus can maximize a uniform profile of light across the scene.

In most implementations it will likely be desirable to achieve essentially uniform illumination for each pixel in every row, and column, of the imager array. However, specific applications may arise in which it is desirable to provide enhanced illumination to some portion of a scene being imaged. In an alternative embodiment, the present invention increases or decreases the illuminance in specific segments of a scene being imaged. Similarly, it may be desirable for different illumination conditions to be provided for different portions of a scene that are not consistent with the manner in which the imager array is readout. For example, it may be desirable to enhance the illumination of the right-hand portion of a scene in order to optimize the illumination of an area towards which a vehicle is turning, in a vehicular night-vision application. In an embodiment, this is obtained by defining the focusing effects of different segments of the illumination system such that multiple segments of the illumination system are focused on the same scene segment. Similarly, it may be desirable to illuminate a given segment of the scene with different wavelengths of illumination. Thus, the number of segments defined in the illumination system may not directly match the number of segments defined in the imaging system.

Figure 12:
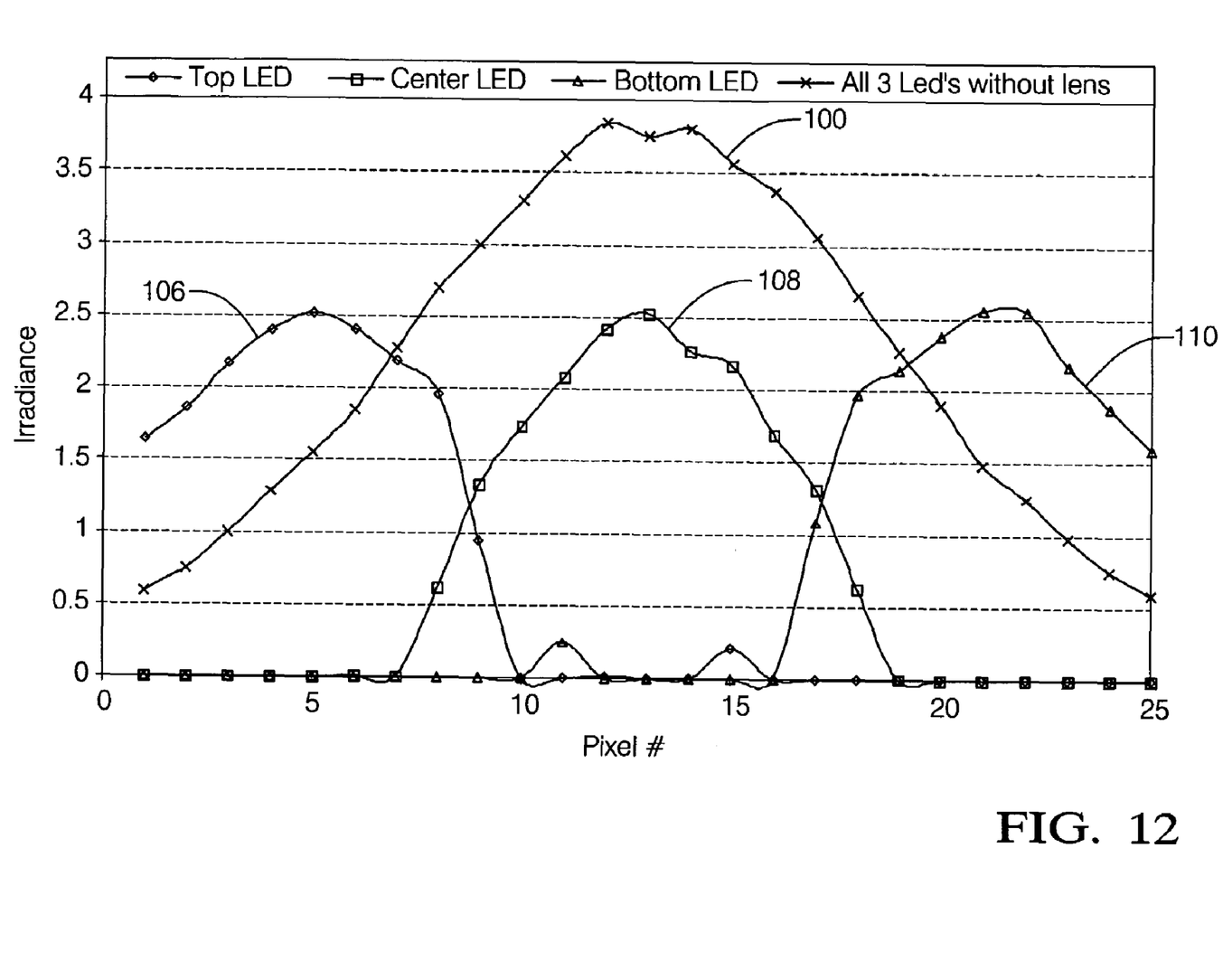
FIG. 12 is a graph of an illumination distribution of each individual LED (top LED, center LED, bottom LED) when operated separately, using the optics described for the present invention in FIG. 10.

FIG. 12 illustrates the illumination distribution of each individual LED (top LED, center LED, bottom LED) when operated separately, using the optics described for the present invention in FIG. 10. The illumination distribution is also shown for the contemporary lens. All illumination distributions are a function of position across the rows of a typical image sensor chip, scaled accordingly. Line 100 illustrates the contemporary illumination distribution obtained by operating all 3 LEDs simultaneously during scaled pixels 1-25, without the present invention zone defining optics. Line 106 illustrates the illumination pattern for the top LED when the zone defining optics are placed before the LEDs according to an embodiment of the present invention. The top LED is turned on for scaled pixels 1-9, and turned off for scaled pixels 10-25. Line 108 illustrates the illumination pattern for the center LED when the zone defining optics are placed before the LEDs according to an embodiment of the present invention. The center LED is turned on for scaled pixels 8-18, and turned off for scaled pixels 1-7 and 19-25. Line 110 illustrates the illumination pattern for the bottom LED when the zone defining optics are placed before the LEDs according to an embodiment of the present invention. The bottom LED is turned off for scaled pixels 1-16, and turned on for scaled pixels 17-25.

Figure 13:
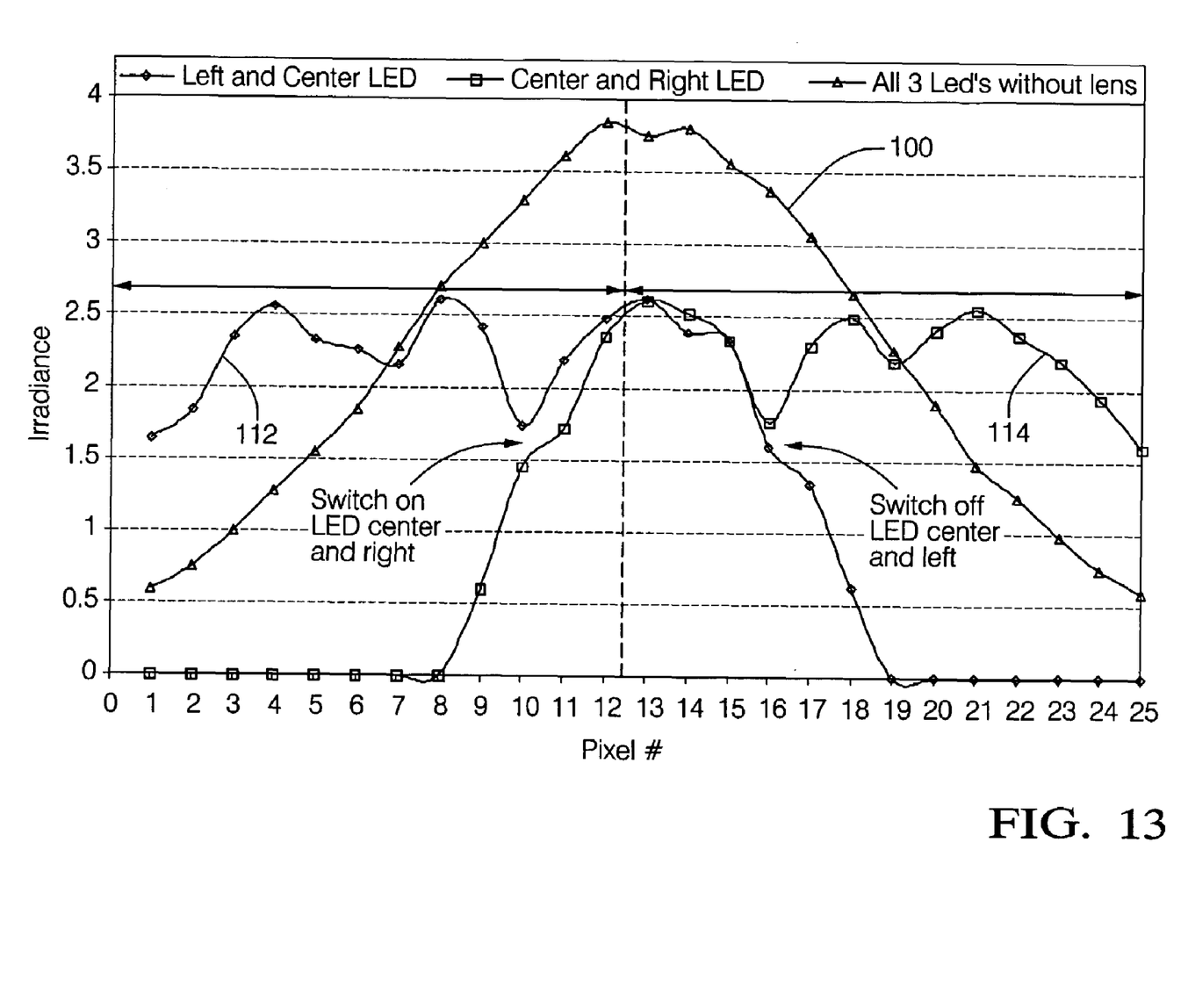
FIG. 13 is a graph of an illumination distribution of LED left and center, followed by the illumination distribution of LED right and center, using the optics described for the present invention in FIG. 10.

FIG. 13 illustrates the illumination distribution of LED left and center (line 112), followed by the illumination distribution of LED right and center (line 114), using the optics described for the present invention. Line 100 illustrates the contemporary illumination distribution obtained by operating all 3 LEDs simultaneously during scaled pixels 1-25. During the sensing period of the upper portion of the imager chip, both the left and center LEDs are turned on. The left LED is turned off immediately after the center row of the imager is readout. Immediately before that row is readout, the right LED is turned on, and both the center and right LEDs remain on during the readout of the lower half of the imaging array. Consequently, the center LED is turned on for 100% of the frame period, while the left and right LEDs are turned on for only 50% of the frame period.

As a result, only two-thirds of the illumination used in FIG. 11 is being provided in illumination in FIG. 13, yet the illumination detected by the pixels in each row of the imager array is identical. Thus, less light must be supplied to achieve a given amount of image sensor response, which results in a wider margin of safety between image sensing system operating conditions and the eye safety limiting conditions. In addition to the direct eye safety benefits associated with the reduction in the amount of light that needs to be produced to achieve a given response of the imaging system, there is an additional improvement in relation to eye safety since the LEDs are aimed in different directions. Because the distribution of emitted light is widened, being emitted from multiple locations within the illumination system, the intensity of light at any physical location in the path of the light is reduced, thus further improving the eye safety margin.

Figure 14:
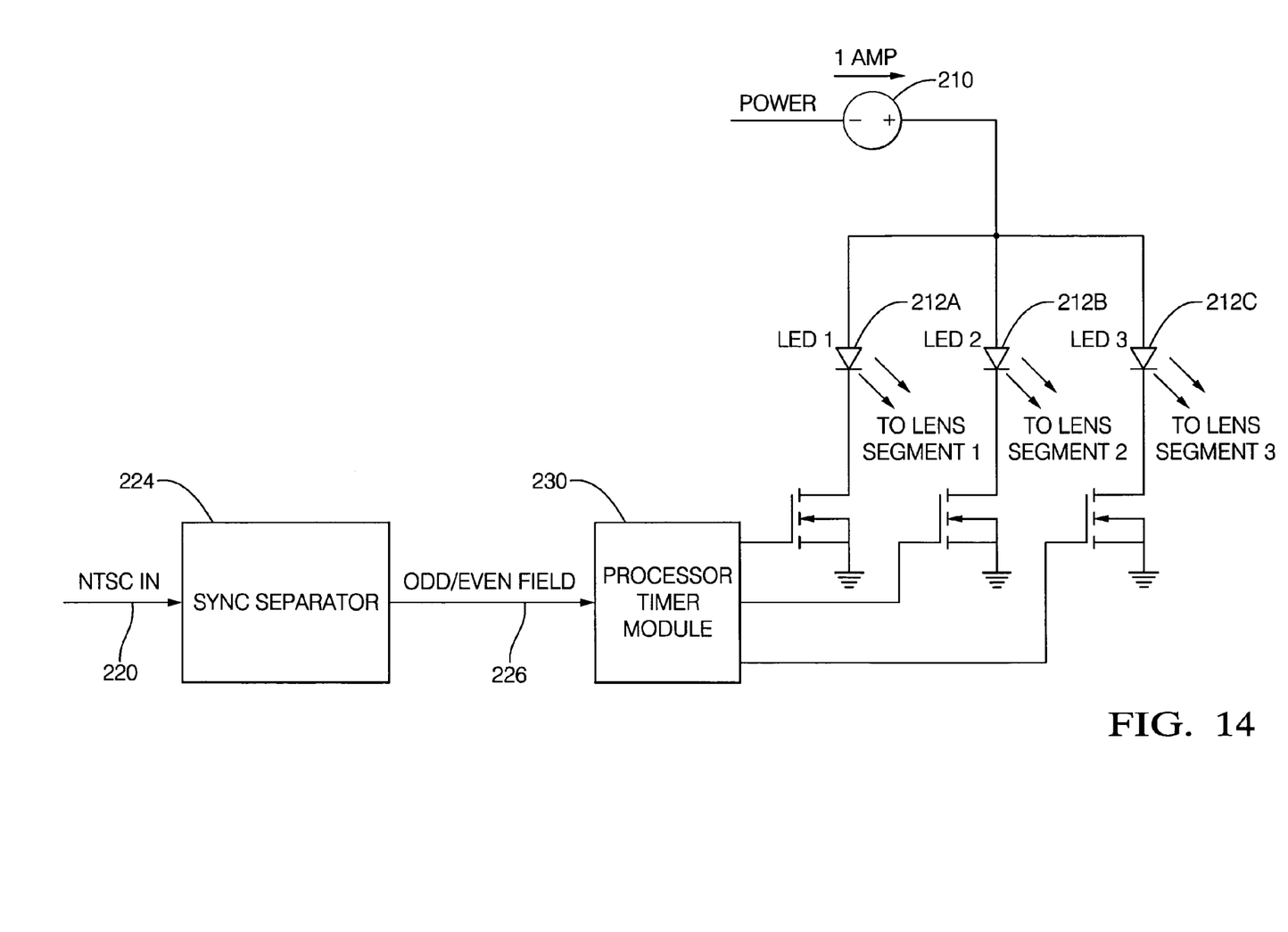
FIG. 14 is a synchronization LED driver circuit block diagram, in accordance with an embodiment of the present invention.

FIG. 14 illustrates a synchronization LED driver circuit block diagram according to an embodiment of the present invention. The circuit diagram can be used to drive and synchronize the LEDs as described in FIG. 10 to achieve the illumination pattern as shown in FIG. 13. As shown, Processor timer module 230 receives all odd and even transmission signals 226 from synch separator 224, synch separator 224 receiving a NTSC transmission 220. Power is supplied to three separate LEDs 212A, 212B and 212C. As previously described, LED 212A transmits light to a first segment of a segmented lens to illuminate a first scene portion, LED 212B transmits light to a second segment of the segmented lens to illuminate the second scene portion, and LED 212C transmits light to a third segment of the segmented lens to illuminate the third scene portion. The synchronization of the LEDs 212A, 212B and 212C are controlled by the signals provided by Processor timer module 230. Processor timer module 230 synchronizes the illumination of LEDs 212A, 212B and 212C when the imager is actively collecting photogenerated charge from the scene that the respective LED is to illuminate. Processor timer module 230 adjusts the timing of activation of each LED based on the number of segmented lens zones. The activation can be accomplished on a row basis or multiple rows basis. Similarly, the processor timer module 230 can be used to divide the LED activation either vertically, horizontally or in some other readout pattern.

Figure 15:
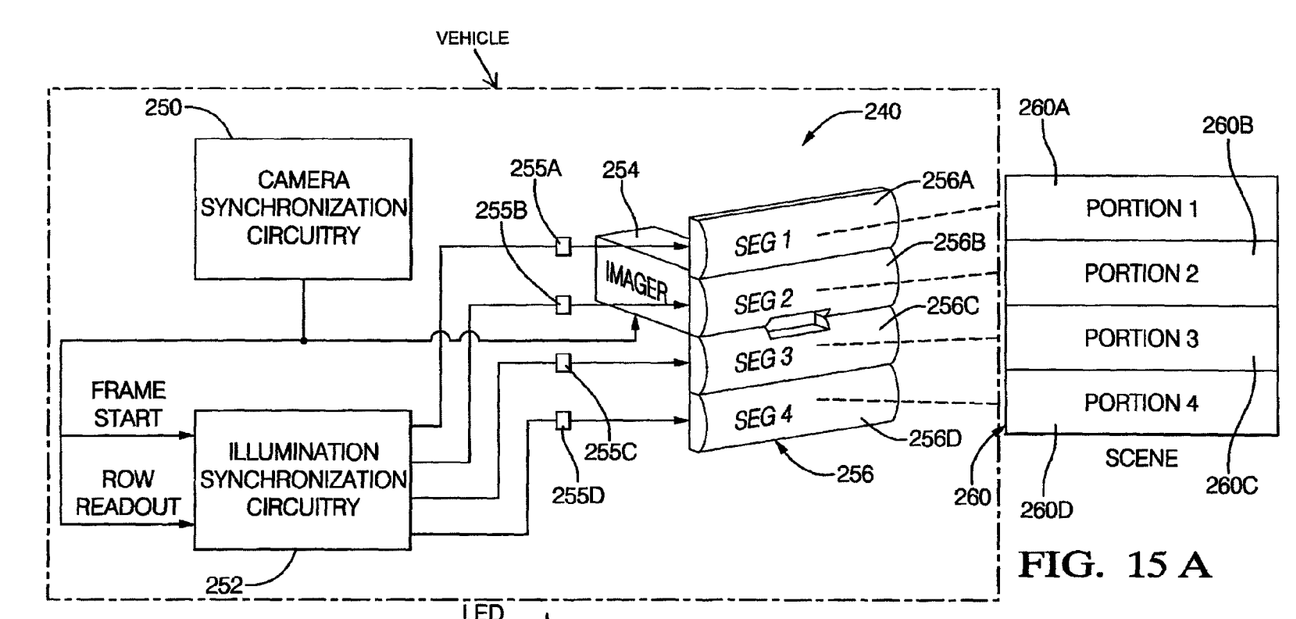
FIG. 15A is a schematic mechanization block diagram imaging system, in accordance with an embodiment of the present invention.
FIG. 15B is a graphical illustration of LED power versus time for individual scene illumination segments, in accordance with an embodiment of the present invention.

FIG. 15A illustrates a block diagram imaging system 240 in an embodiment of the present invention. A portion of the synchronization timing signals that control the operation of an imaging system camera 250 are extended to an illumination control module 252. Specific timing signals that may be needed to effect the synchronization of the image capture and scene illumination processes include the "start of frame signal" which instructs the imager chip 254 to capture one frame or snapshot of image data, and the row readout timing signal, which synchronizes the operation of the imager chip 254 to sequentially instruct each row of the imaging array to, for example, stop collecting charge, to initiate the readout of charge from each pixel in the given row of the imaging array, to reset the row of pixels (i.e., clean out residual charge, etc.) and to initiate the collection of photo-induced charge for the next frame period. In the embodiment illustrated in FIG. 15A, the illumination system 256 is comprised of 4 segments or zones 256A-D, and the synchronization of illumination and image capture is also implemented to identify 4 segments 260A-D of the scene 260. The illumination control module 252 then determines the appropriate timing periods and sequences to synchronize the illumination elements, which may be a plurality of LEDs 255A-D, and distributes the appropriate control and power signals to the appropriate elements of the illumination portion of the active illumination system 256. Finally, although FIG. 15A shows lens segments 256A-D which provide focusing action in only one dimension, lens segments having more complicated two dimensional contours are similarly contemplated by the present invention.

FIG. 15B is a graphical illustration of LED power versus time for four individual scene illumination segments as in FIG. 15A. As shown, the LED power to segment 1 is set on (illuminated) or to a higher power level when the LED power for other segments is set off or to a lower power level as compared to segment 1. Similarly, when the LED power to segment 1 is set off or lowered, then the LED power to segment 2 is set on or increased. The LED power to the remaining segments follow in a similar manner. Additionally, there may be times when LED power level overlap to particular illumination segments is desired and the present invention can employ such overlap. For example, segment 1 may be illuminated at the same time that segment 2 is illuminated, during a fraction of segments 1 and 2 total illumination time. Further, the scene portions may be sequentially illuminated. The light source can also be sequenced so a uniform or non-uniform scene illumination distribution is created, as further described with reference to FIG. 9.

Other features and advantages of this invention will be apparent to a person of skill in the art who studies this disclosure. Thus, exemplary embodiments, modifications and variations may be made to the disclosed embodiments while remaining within the spirit and scope of the invention as defined by the appended claims.

We claim:

1. A method of synchronizing an actively illuminated imaging system comprising:
employing one of a global shutter imager and a rolling shutter imager;
segmenting an image scene into a plurality of image scene portions comprising a first image scene portion and a second image scene portion;
sequentially illuminating the first image scene portion and the second image scene portion, wherein the first image scene portion is illuminated when an imager is actively collecting photogenerated charge as a function of light reflected from the first image scene portion, and the second image scene portion is illuminated when the imager is actively collecting photogenerated charge as a function of light reflected from the second image scene portion, wherein a time period of illuminating the first image scene portion is substantially equal to a time period of illuminating the second image scene portion; and sequentially reading out pixels of the imager to produce an image, such that the segmented image scene portions form the image.

2. The method as in claim 1, wherein sequentially illuminating comprises employing a first light source to transmit to a first segment of a segmented lens to illuminate the first image scene portion, and employing a second light source to transmit to a second segment of the segmented lens to illuminate the second image scene portion.

3. The method as in claim 2, wherein the first light source transmits a first light, and the second light source transmits a second light, wherein the first light and the second light vary in at least one of band of wavelength and polarization.

4. The method as in claim 2, wherein the first light source transmits a first light intensity and the second light source transmits a second light intensity, to enhance an identification of an object in the image scene.

5. The method as in claim 1, wherein segmenting the image scene comprises dividing the plurality of image scene portions one of vertically and horizontally.

6. The method as in claim 1, wherein segmenting the image scene comprises segmenting the image scene by imager pixel row.

7. The method as in claim 1, further comprising at least one of extending an integration time of the first image scene portion pixel rows, reducing a readout time of the first image scene portion pixel rows, and reducing a quantity of the first image scene portion pixel rows, to allow for a time period during which the first image scene portion pixel rows can be illuminated when the imager is actively collecting photogenerated charge from the first image scene portion pixel rows.

8. The method as in claim 1, wherein the imaging system maintains a frame rate of at least about 30 frames per second.

9. The method as in claim 1, wherein imaging system is utilized in an automotive imaging application including a monitoring driver gaze system, vehicle night vision systems, vehicle backup aid systems, varying illumination of an object surrounding a vehicle, a security application, and augmenting illumination for a conventional imager.

10. The method of claim 1, wherein the step of sequential illuminating further comprises synchronizing the imager and a plurality of light sources that illuminate the plurality of image scene portions of the image, such that at least one of the plurality of image scene portions that is illuminated by at least one of the plurality of light sources is the portion that the imager is actively collecting photogenerated charge from.

11. The method of claim 10, wherein an irradiance pattern is spatially varied that allows for a substantially uniform distribution of light by redistributing intensity away from a center of a field to a periphery of the field.

12. An actively illuminated imaging system comprising:
a plurality of light sources for individually transmitting light; and
a segmented lens for receiving the individually transmitted light, and directing the individually transmitted light to an image scene that is segmented into a plurality of image scene portions comprising:
a first image scene portion, wherein a first light source of the plurality of light sources transmits to a first segment of segmented lens to illuminate the first image scene portion; and
a second image scene portion, wherein the first image scene portion and the second scene portion are sequentially illuminated, such that a second light source of the plurality of light sources transmits to a second segmented lens to illuminate the second image scene portion; and
an imager configured to actively collect photogenerated charge as a function of light reflected from the first image scene portion when the first image scene portion is illuminated, and actively collect photogenerated charge as a function of light reflected from the second image scene portion when the second image scene portion is illuminated, such that the imager and the plurality of light sources are synchronized so that at least one of the plurality of image scene portions illuminated by at least one of the plurality of light sources is the portion that the imager is actively collecting photogenerated charge from, wherein a time period of illuminating the first image scene portion is substantially equal to a time period of illuminating the second image scene portion, and the imager is a rolling shutter imager, wherein pixels of the imager are sequentially read out to produce an image, such that the segmented image scene portions form the image.

13. The system as in claim 12, wherein the first light source transmits a first light, and the second light source transmits a second light, wherein the first light and the second light vary in at least one of band of wavelength and polarization.

14. The system as in claim 12, wherein the first light source transmits a first light intensity and the second light source transmits a second light intensity, to enhance an identification of an object in the scene.

15. The system as in claim 12, wherein the plurality of image scene portions are divided one of vertically and horizontally.

16. The system as in claim 12, wherein the image scene is segmented by imager pixel row.

17. The system as in claim 12, wherein an integration time of the first image scene portion pixel rows is extended, a readout time of the first image scene portion pixel rows is reduced, and a quantity of the first image scene portion pixel rows is reduced, to allow for a time period during which the first image scene portion pixel rows can be illuminated when the imager is actively collecting photogenerated charge from the first image scene portion pixel rows.

18. The system as in claim 12, wherein the imaging system maintains a frame rate of at least about 30 frames per second.

19. The system as in claim 12, wherein imaging system is utilized in an automotive imaging application including a monitoring driver gaze system, vehicle night vision systems, vehicle backup aid systems, varying illumination of an object surrounding a vehicle, a security application, and augmenting illumination for a conventional imager.

* * * * *